Sept. 28, 1948.　　　　　N. S. RICH　　　　2,450,166
ELECTRICAL DETECTION APPARATUS

Filed Aug. 18, 1944　　　　　　　　　　　2 Sheets-Sheet 1

Inventor
Nicholas S. Rich

Sept. 28, 1948.   N. S. RICH   2,450,166
ELECTRICAL DETECTION APPARATUS
Filed Aug. 18, 1944   2 Sheets-Sheet 2

Inventor
Nicholas S. Rich

Patented Sept. 28, 1948

2,450,166

UNITED STATES PATENT OFFICE 2,450,166

ELECTRICAL DETECTION APPARATUS

Nicholas S. Rich, Milwaukee, Wis.

Application August 18, 1944, Serial No. 549,987

5 Claims. (Cl. 177—329)

This invention relates to apparatus for detecting the passage of automotive vehicles and has particular reference to traffic control devices.

Heretofore traffic control systems which incorporate means by which the passage of vehicles is utilized to change the direction signals have been controlled by detectors which were either of the permanent magnet or mechanical type, the former being on the order of that illustrated in the patents to J. L. Barker, Nos. 2,201,145 and 2,201,146, and the latter being the conventional depressible switch closing strip extending across the pavement.

The present invention employs a detector which is neither mechanically actuated nor magnetically actuated in the sense that its functioning depends upon the vehicle cutting or distorting a field of magnetic force radiating from a permanent magnet, but instead is responsive to the magnetic field radiating from a vehicle by virtue of the functioning of its electrical equipment and to the magnetic field resulting from the discharge flow of electrostatic energy accumulated by the vehicle as a result of tire friction and atmospheric friction while the vehicle is in motion.

It therefore follows that the primary purpose of this invention is to provide a detection apparatus the functioning of which is initiated by the movement of the magnetic field which surrounds an automotive vehicle past a suitably located detector.

Inasmuch as the response of the apparatus is not dependent upon the cutting or distortion of a magnetic field emanating from a permanent magnet or the earth, the principal disadvantages of the magnetic detection devices heretofore employed are obviated.

For instance, the device of this invention can be installed without regard for the earth's magnetic field as it is not affected thereby. The detector per se of the present system is also not affected by normal vibration which in the case of the permanent magnet type of detector was a fruitful source of trouble, the reason being that any relative motion, no matter how slight, between the detector coil and the earth's magnetic field "tripped" the system.

Another very important advantage of the present system over the permanent magnet type is that it is not objectionably affected by the proximity of ferrous metals and as a consequence the makeup of the pavement does not interfere with the operation of the system, hence no need exists for cutting away the reinforcing rods of the pavement.

Another advantage of the present system lies in the fact that it is not affected by heat or cold.

As will be apparent from the description hereinafter, the present system is capable of greater accuracy than past detection apparatus as its sensitivity can be adjusted to require the vehicle to be closely adjacent to the detector to initiate the functioning thereof.

In addition to the foregoing there are many other reasons why the present invention surpasses the permanent magnet type of detector which will be apparent as this description proceeds; and as to those systems that employ mechanical detectors, the advantages of the present invention are deemed obvious.

The difficulties inherent in any permanent magnet type of detector system such as that of the aforesaid Barker patents, led to complicated control systems which not only were costly to manufacture and install, but extremely difficult to maintain, and it is therefore another object of this invention to provide a detection system or apparatus which is simple and inexpensive.

It is also an object of this invention to provide a detection system or apparatus which is so designed and constructed that it may be adapted for any particular type of service and which can be so designed and constructed that when used for traffic control any automotive vehicle approaching an intersection will positively actuate the system, regardless of the speed at which the vehicle is traveling or the nature of the vehicle.

Still another object of this invention is to provide a vehicle detector apparatus that will reliably respond to and record the passage of every vehicle regardless of how closely one vehicle may follow another.

With the above and other objects in view which will appear as the description proceeds this invention resides in the novel construction, combination and arrangement of parts substantially as hereinafter described, and more particularly defined by the appended claims, it being understood that such changes in the precise embodiment of the herein-disclosed invention may be made as come within the scope of the claims.

The accompanying drawings illustrate two complete examples of the physical embodiment of the invention constructed in accordance with the best modes so far devised for the practical application of the principles thereof, and in which.

Figure 1:
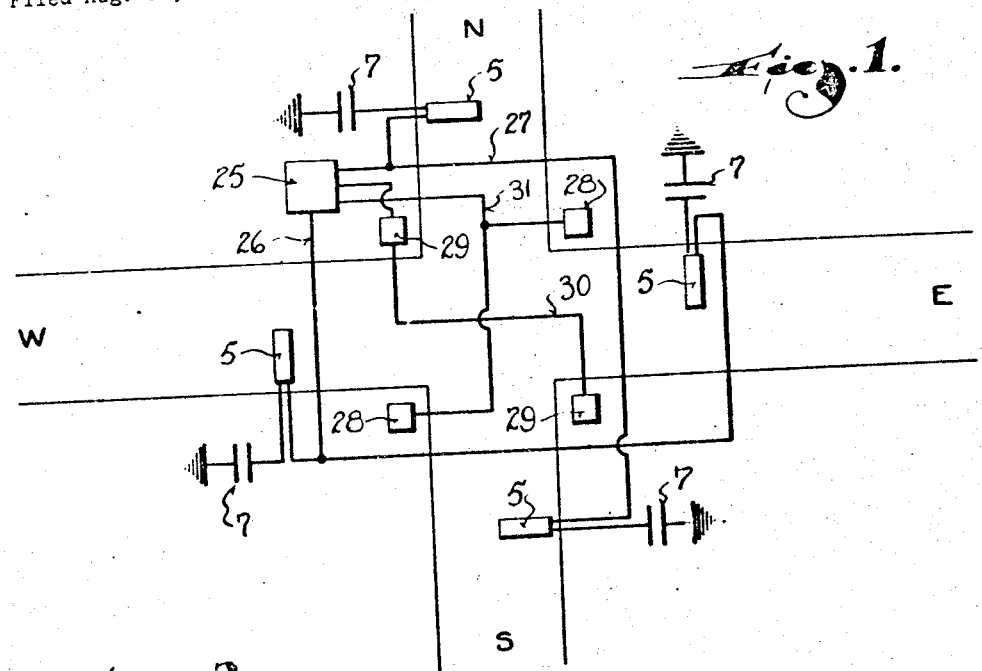
Figure 1 is a diagrammatic plan view of a highway intersection, illustrating one application of this invention.

Referring now particularly to the accompanying drawings in which like numerals indicate like parts, and specifically to Figure 2 where the "heart" of the system is illustrated, the numeral 5 designates generally the detector of the system which, in the case of a traffic control system, is embedded in the pavement in a manner to be hereinafter described.

This detector is broadly an inductance, and specifically it is a solenoid the turns of which are wound on a core 6 of special metal hereinafter to be more fully described. Inasmuch as the system is not dependent upon the magnetic field of a permanent magnet the coil 5 need not be wound with the extreme degree of care required of permanent magnet systems of detection as the losses occasioned by hysteresis have no effect upon the operation of the present system.

One end of the coil 5 is connected to one side of a power condenser 7 which may be either the paper type or the electrolytic type, the latter being preferable. The other side of the power condenser 7 is grounded and the other end of the coil is also grounded through a potentiometer 8 and a fixed resistance 16. A closed circuit is thus provided which includes capacitance (the condenser 7), inductance (the coil 5), and resistance (potentiometer 8 and fixed resistance 16). The rise and fall of voltage induced in the coil by the passage of an automotive vehicle, therefore, charges the condenser 7, and as this charge leaks off through the coil and resistance, it provides a voltage drop across the potentiometer 8 and resistance 16. A condenser 11 couples the variable contactor of the potentiometer with the grid 10 of a thermionic tube 9 so that the selected voltage across the potentiometer 8 is applied to the grid of the tube in consequence to the discharge of the power condenser 7. Hence, with each discharge of the condenser following the passage of a vehicle across the detector coil a positive bias is impressed upon the grid of the tube and the tube is thus rendered conductive.

The adjustment of the potentiometer, of course, determines the amplitude of the bias potential impressed upon the grid of the tube through the condenser 11, the fixed resistance 16 serving as a minimum point of adjustment.

The tube 9 may be of any suitable type and in the present instance is illustrated as a triode; and as is customary, a grid leak resistor 18 coacts with the condenser 11 and the cathode or filament 12 of the tube to provide a predetermined normal grid bias.

Filament voltage is derived from an adequate source such as a battery 13, and the plate circuit of the tube, which is fed by a battery or other source of potential 14, contains an appropriate relay 15 to be actuated whenever the tube 9 becomes conductive, which, of course, is dependent upon the potential of the bias on its grid 10.

To insure stability in the circuit a small capacity condenser 17 is provided which bypasses small undesired fluctuations which may be superimposed upon the impulse wave form; and in the plate circuit of the tube 9 a condenser 19 is preferably connected across the coil of the relay to filter out the ripple present where rectified A. C. power supplies are used in preference to a battery.

The armature 20 of relay 15 is arranged to close a circuit 21 fed from a suitable source of current 22 and including a signal or other instrumentality to be actuated, designated generally by the numeral 23.

If the power circuit is used to operate traffic signals such as employed for highway traffic control, a timer 24 is preferably included in the circuit to coordinate the several signals.

For the benefit of those skilled in the art, but not with any intention of limiting the invention, the values for the various elements of the system shown in Figure 2, which is designed primarily for traffic control, may be as follows:

The power condenser 7, 50 mfd.;
The inductance comprising the detector 5, 88,000 turns of number 38 enameled wire, having a resistance of 15,000 ohms;
The potentiometer 8, 100,000 ohms;
The series resistance 16, 10,000 ohms;
The bypass condenser 17, .1 mfd.;
The condenser 11, .5 mfd.;
The grid leak 18, 10 megohms;
The A or filament voltage 13, a conventional storage battery of 6.3 volts;
The B or plate voltage, 45 volts.

The values of the power circuit 21 need not be given, and quite obviously suitable amplification can be incorporated in the relay circuit to build up the slight voltage of the initiating circuit to the value necessary to operate the relay, but inasmuch as such amplification is well known it has not been illustrated.

Figure 2:
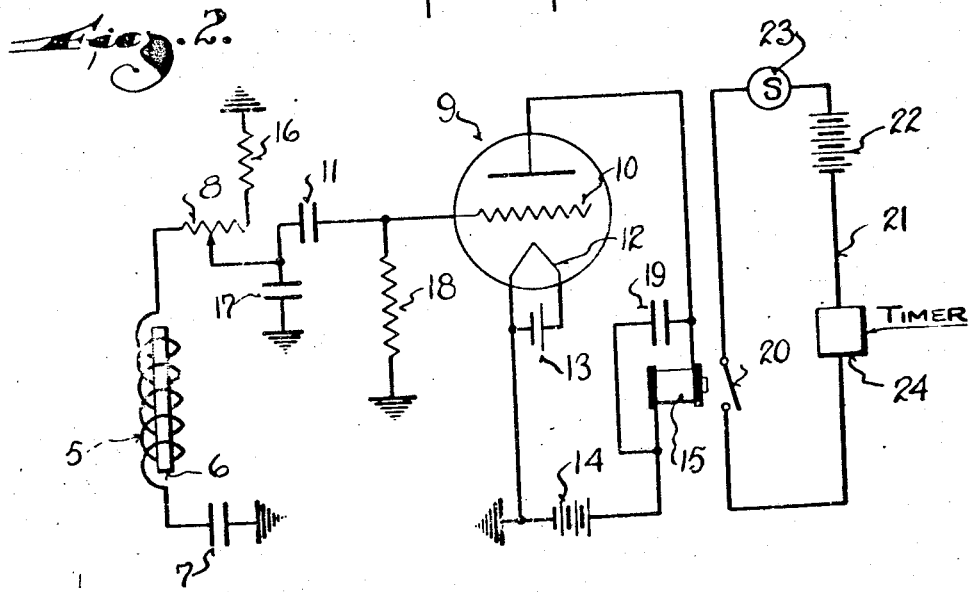
Figure 2 is a circuit diagram illustrating the "heart" of the system.

The operation of the system diagrammatically illustrated in Figure 2 is as follows:

Upon the passage of a vehicle across or in proximity to the detector coil 5, a voltage is induced in the coil by the passage of the magnetic field which surrounds the vehicle. By virtue of the motion of the vehicle past the coil, the voltage induced in the coil is A. C., of a frequency depending upon the speed of the vehicle and thus relatively low, but of only one cycle with the first half of the cycle either positive or negative, depending upon the way the coil and condenser are connected in the initiating circuit. If condenser 7 is of the electrolytic variety, only the positive half of the A. C. impulse will be fed to the circuit, the negative half flowing directly to ground through the condenser. If a paper type condenser is used, both the positive and negative halves of the cycle will flow in the initiating circuit, but since the negative half of the cycle will merely increase the negative grid bias voltage, the net result will be the same in either case, that is, the tube will be rendered conductive during the positive phase of the impulse cycle.

It will be understood that whether the condenser 7 is of the electrolytic or paper type, it provides, together with the coil, a resonant circuit which, in view of the values selected, is tuned to the low frequency of the alternating currents induced in the coil by the passage of automotive vehicles in its proximity.

The potentiometer 8, which determines the amplitude of the bias potential supplied by the initiating circuit, is adjusted so that the positive bias placed on the grid 10 of the tube renders the tube conductive for a period long enough to close the relay circuit, whereupon the response of the relay armature 20 closes the power circuit. If the service for which the system is installed requires holding the relay circuit closed for longer than a short interval, a delayed action relay or suitable holding circuit may be employed.

Figure 3:
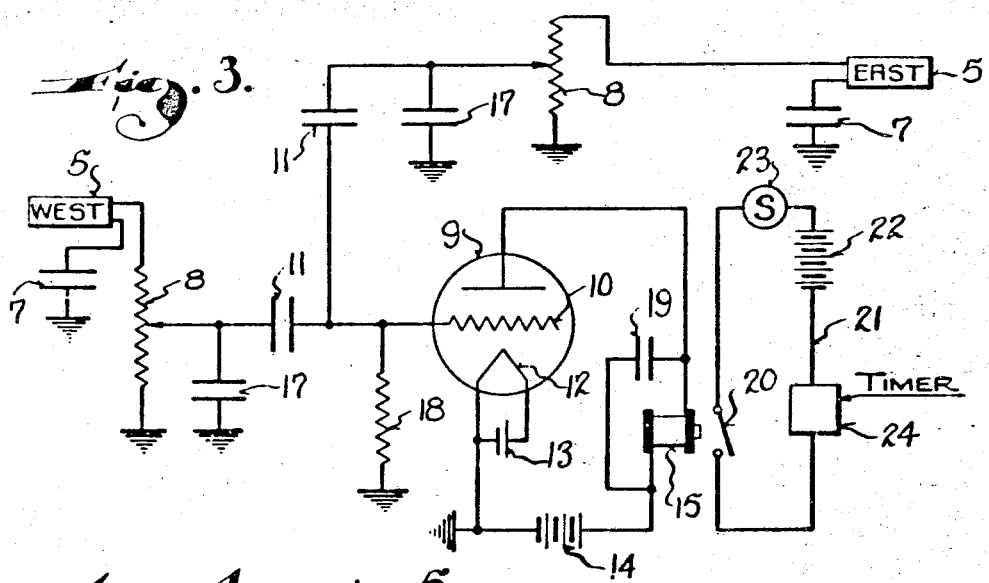
Figure 3 is a circuit diagram illustrating the application of the invention to traffic control as shown in Figure 1.

If the invention is applied to simple highway traffic control (not cross traffic, but for instance, at a dangerous curve) the circuits are as illustrated in Figure 3 where two detector coils 5 are shown. For such service two detectors, one for traffic bound in one direction and one for traffic bound in the opposite direction are connected in parallel with the thermionic tube 9 which is connected in a relay circuit to control the functioning of a relay 15 the same as previously described.

Where cross traffic must be controlled, the arrangement illustrated diagrammatically in Figure 1 is employed. Here it is simply a case of adding the required number of detector coils and power condensers and connecting all of them with a central control unit indicated generally by the numeral 25. The "east" and "west" bound traffic detectors are connected with this central control 25 by a common lead 26. The "north" and "south" bound traffic detectors are connected with the central control by a common lead 27.

At the central control the impulses made by the various detectors are coordinated and timed to turn the "east" and "west" bound signals 28 and the "north" and "south" bound signals 29 on and off, a common lead 30 connecting the central control with the former and a common lead 31 connecting the central control with the latter signals.

The requirements of the mounting for the detector coil 5 are simple as compared to those of electrical detection systems heretofore in use. It is only necessary that the coil 5 be insulated from ground, but as can be readily appreciated the coil should be adequately protected not only against the elements after installation but also against intentional tampering (which might occur where the coil must be mounted in an exposed location) and the rough handling which it is apt to receive prior, during and after installation.

Figure 4:
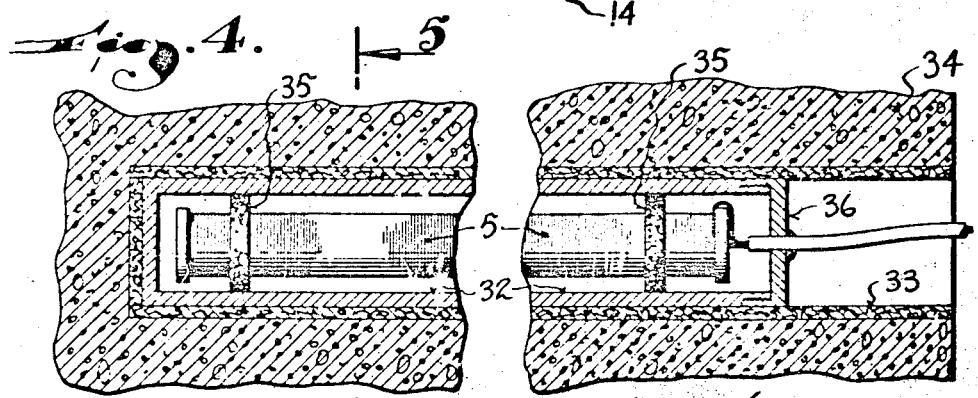
Figure 4 is a side view of the detector per se of this invention illustrating the manner in which it is mounted in the pavement.
Figures 5, 6:
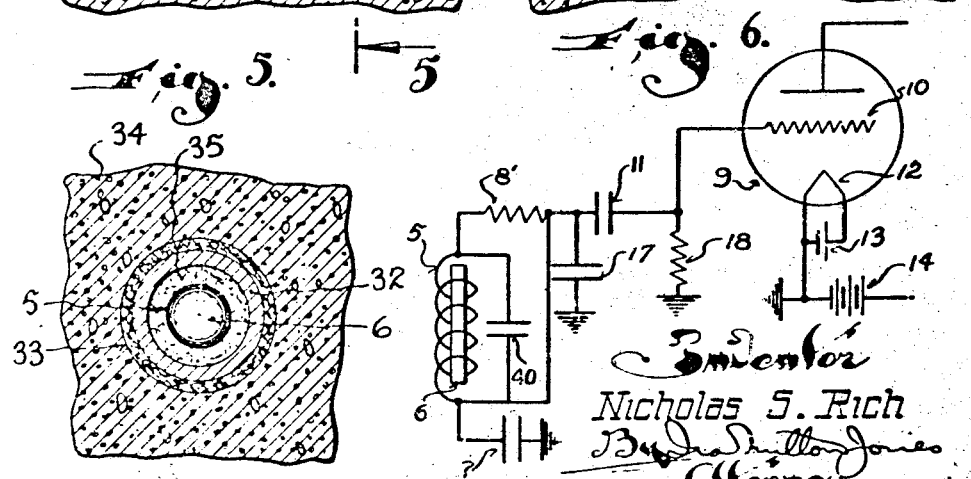
Figure 5 is a cross-sectional view through Figure 4 on the plane of the line 5—5.
Figure 6 is a diagrammatic view similar to Figure 2 but illustrating a slightly modified circuit.

The most practical and feasible form of protective covering is a metal sheath or casing such as illustrated at 32 in Figures 4 and 5. Spacing collars 35 hold the coil spaced from the walls of the sheath. The sheath may be made of any metal, but copper, brass or aluminum are preferable.

The necessity for having the sheath or casing ungrounded is to insure that the passage of the vehicle will induce electrodynamic potential of sufficient magnitude in the detector coil.

For the actual installation it is convenient to embed a duct 33 of fiber or other suitable insulating material in the concrete pavement 34 with its inner end closed and its outer end opening to the side of the pavement and into a pit (not shown) alongside the pavement. The metal encased coil is then slipped lengthwise into the insulating duct 33 and, as clearly shown in Figure 4, the ends of the coil are connected to suitable insulated conductors which pass through the removable cap 36 of the metal sheath to enter the pit (not shown) from where an underground cable can be led to the central control box.

Obviously, the installation of the detector coils should be such that the admission of moisture to the coil is guarded against, but beyond this no special attention need be given the installation of the coil.

While the circuit of Figure 2 is generally receptive to transient magnetic fields of all types, this is not objectionable as by proper selection of the values of its constants the initiating circuit can be tuned to be responsive only to the magnetic fields emanating from passing automotive vehicles. If the installation must be made in proximity to powerful sources of disturbing electrical influences, such as high tension A. C. power lines, the simple addition of a condenser 40 across the inductance 5, as shown in Figure 6, will further peak or tune the initiating circuit to exclude the objectionable influence.

If a paper type condenser is used either half of the cycle of A. C. induced in the detector coil charges the condenser, and the initiating circuit takes on the characteristics of a free oscillating circuit so that if desired the thermionic tube may be rendered conductive a number of times for each signal impulse, the number being determined by the magnitude of the initial charge upon condenser 7 and the setting of potentiometer 8. Because of the oscillatory character of the response with a paper type condenser, the output of the detector circuit is slightly higher than in the case where an electrolytic condenser is used; however, the electrolytic condenser has the advantage of excluding any stray ground currents that might be flowing in the ground and is considerably more compact than a paper condenser of the required capacity.

A paper type condenser is also better suited to the slightly modified circuit shown in Figure 6. In this circuit the voltage output is across the condenser 7, the value of which may be between .5 and 2 mfd.; and the potentiometer is supplanted by a fixed resistance 8' of chosen value, in this case approximately 150,000 ohms.

As hereinbefore indicated the core of the detector coil is preferably formed of a special alloy. As can be readily appreciated the device of this invention is concerned not only with the detection of magnetic impulses of extremely small magnitude, but also rapidly passing and repeated impulses. Hence it is desirable that the detector be so designed as to make the most of these slight, short lived impulses. To this end the core 6 is formed of a substantially non-retentive alloy of nickel and iron in various proportions to give it permeability which is high in comparison to that of iron and steel. The proportion of nickel is between 40 and 75 percent, the remainder being iron. The permeability of this alloy is in the neighborhood of 2,000 to 4,000, which is five to six times the permeability of silicon steel in the grade generally used for transformers and magnetic type detectors. The addition of a small amount, about 1.5% of manganese increases the permeability to as much as 10,000.

Due to the high permeability, the voltage induced in the coil builds up rapidly and the amplitude of the voltage is increased as a function of the number of turns surrounding the core.

From the foregoing description, taken in connection with the accompanying drawings, it will be readily apparent to those skilled in the art, that this invention provides an electrical detection system or apparatus which is reliable, exceedingly simple, and inexpensive to manufacture, install and maintain; and one which, while admirably adapted for use in connection with

What I claim as my invention is:

1. Detector apparatus for detecting the passage of automotive vehicles comprising the combination of: a detector unit adapted to have E. M. F. induced therein by the passage in proximity thereto of an automotive vehicle; a condenser; means defining a closed condenser charging circuit, including said detector unit and the condenser connected in series circuit whereby the condenser becomes charged in consequence to the induction of an E. M. F. in the detector unit; a thermionic tube having a control grid; a resistance; means connecting the resistance with the detector unit and the condenser so that discharge of the condenser effects a voltage drop across the resistance; and means for applying a potential derived from the voltage drop across the resistance upon the grid of the tube to supply positive grid bias thereto and thereby render the tube conductive for the passage of current by which an indicator may be actuated.

2. Apparatus for detecting the passage of vehicles and other objects from which magnetic fields emanate, comprising: an induction coil adapted to have an E. M. F. induced therein by the passage in proximity thereto of a vehicle or other object from which a magnetic field emanates; a condenser adapted to be charged by the E. M. F. induced in the induction coil and connected between one end of the coil and ground; a resistance connected between the other end of the coil and ground, said condenser, coil, and resistance forming with ground a closed circuit so that upon the induction of an E. M. F. in the coil said condenser becomes charged, the charge on the condenser leaking off through said closed circuit and resulting in a voltage drop across the resistance; and means for impressing said voltage drop upon the grid of the tube to provide positive grid bias therefor and thus render the tube conductive.

3. Detector means for use with vehicle actuated traffic signals comprising: an induction coil in which a voltage is induced by the passage in proximity thereto of an automotive vehicle; a condenser adapted to be charged by the voltage thus induced in the coil; means defining a closed circuit including the coil, the condenser, and a resistance whereby the induction of voltage in the coil charges the condenser and discharge of the condenser through said circuit results in a voltage drop across the resistance; a thermionic tube adapted to control a circuit for initiating the functioning of a traffic signal; and means for impressing the voltage drop across the resistance upon the grid of the tube so that the discharge of the condenser provides positive grid bias to render the tube conductive.

4. Apparatus for detecting the passage of vehicles and other objects from which magnetic fields emanate, comprising: an induction coil adapted to have an E. M. F. induced therein by the passage in proximity thereto of a vehicle or other object from which a magnetic field emanates; an electrolytic condenser directly connected between one end of the coil and ground with the positive side of the condenser grounded; a resistance connected between the other end of the coil and ground, said condenser, coil and resistance forming with ground a closed circuit so that at one polarity the E. M. F. induced in the coil leaks off to ground through the condenser while at the opposite polarity the E. M. F. induced in the coil places a charge upon the condenser which leaks off through said closed circuit and in so doing effects a voltage drop across the resistance; and means connecting said resistance with the grid of the tube to impress positive bias potential upon the grid of the tube from the voltage drop which occurs across the resistance during discharge of the condenser to thereby render the tube conductive.

5. A detector apparatus of the character described comprising: an induction coil adapted to have an E. M. F. induced therein by the passage in proximity thereto of an automotive vehicle; a condenser adapted to be charged by the emf induced in the coil; means defining a closed circuit including the coil and condenser connected in series circuit so that a charge is built up in the condenser in consequence to the passage of an automotive vehicle in proximity to the coil to leak off through the coil and said closed circuit; an electric current controlling device adapted to control a circuit in which said device is connected, said device having a control element and being rendered conductive by the impression upon its control element of a predetermined small voltage; means connected with said circuit and in which the discharge of the condenser through the coil and said circuit effects a voltage drop; and means for impressing said voltage drop upon the control element of said current controlling device.

NICHOLAS S. RICH.

REFERENCES CITED

The following references are of record in the file of this patent:

UNITED STATES PATENTS

| Number | Name | Date |
| --- | --- | --- |
| 1,715,543 | Elmen | June 4, 1929 |
| 1,751,330 | Hirt | Mar. 18, 1930 |
| 1,880,805 | Christopher | Oct. 4, 1932 |
| 1,992,214 | Katz | Feb. 26, 1935 |
| 2,201,146 | Barker | May 21, 1940 |
| 2,243,341 | Horni | May 27, 1941 |